United States Patent
Woram

(10) Patent No.: US 6,728,262 B1
(45) Date of Patent: Apr. 27, 2004

(54) SYSTEM AND METHOD FOR INTEGRATING PROCESS CONTROL AND NETWORK MANAGEMENT

(75) Inventor: Stephen E. Woram, Addison, TX (US)

(73) Assignee: COI Software, Inc., Addison, TX (US)

( * ) Notice: Subject to any disclaimer, the term of this patent is extended or adjusted under 35 U.S.C. 154(b) by 792 days.

(21) Appl. No.: 09/677,205

(22) Filed: Oct. 2, 2000

(51) Int. Cl.$^7$ .................................................. H04J 3/16
(52) U.S. Cl. ....................................... 370/466; 370/241
(58) Field of Search .......................... 714/25; 707/217; 370/466, 467, 216, 242, 254, 241; 709/223

(56) References Cited

U.S. PATENT DOCUMENTS

| | | | |
|---|---|---|---|
| 5,761,502 A | * 6/1998 | Jacobs | |
| 6,008,805 A | * 12/1999 | Land et al. | 345/335 |
| 6,131,112 A | * 10/2000 | Lewis et al. | 709/207 |
| 6,138,049 A | * 10/2000 | McLaughlin | 700/67 |
| 6,144,993 A | * 11/2000 | Fukunaga et al. | 709/208 |
| 6,145,001 A | * 11/2000 | Scholl et al. | 709/223 |
| 6,496,859 B2 | * 12/2002 | Roy et al. | 709/223 |
| 6,510,139 B1 | * 1/2003 | Yoshida | 370/328 |
| 6,633,312 B1 | * 10/2003 | Rochford et al. | 345/736 |

* cited by examiner

Primary Examiner—Kenneth Vanderpuye
(74) Attorney, Agent, or Firm—Fulbright & Jaworski L.L.P.

(57) ABSTRACT

The present invention discloses a system and method for integrating the management of process control and network operation into one HMI software platform. The invention allows the simultaneous management of process control data and network diagnostic data transmitted over an open architecture network. The inventive system and method incorporates a network data interface in the HMI platform which retrieves network condition information using a standard network transmission protocol and then converts the diagnostic information into a useable process control format. The network information may then be readily accessed by the HMI software platform as any other process control information for display to users in a singular user interface. The resulting display allows for simultaneous monitoring and management of real-time process control and network information.

62 Claims, 5 Drawing Sheets

SYSTEM AND METHOD FOR INTEGRATING PROCESS CONTROL AND NETWORK MANAGEMENT

BACKGROUND

The manufacturing process for virtually every industry has evolved to some level of automation. Computers and computer-controlled machinery now control and monitor almost every aspect of the manufacturing and industrial process. The management of this automation involves elaborate and detailed software platforms targeted to perform industrial or process control. Most companies within the industrial controls market use software referred to as Human Machine Interface (HMI) software. HMI is a generic term describing any software package used to interface process control information with a human operators.

In its basic elements, HMI systems communicate with field controllers and bring data from those controllers into a central database for processing and monitoring. An operator in a single location can then monitor and control the industrial process throughout a facility. HMI systems, therefore, centralize the management and collection of data from field control devices into one location.

Field controller devices are connected to a process control system over a communication network and typically comprise programmable logic controllers (PLCs), which are programmable computing devices used to monitor elements or conditions in plant or machine operation such as temperature, pressure, number of cycles, etc. The PLC itself may comprise a small box with several computer controlled instruments or may comprise a self-contained microcontroller system. A PLC "box" may comprise an oscilloscope functionality, a computer controlled valve, or a simple environmental sensor, such as a thermometer or barometer. PLCs may also generally be used to control various tasks in the overall manufacturing or industrial process such as stopping or starting the flow of material or electricity, diverting flow, or any other such activity. In order to properly manage process control information, HMI systems generally need to have the process control data, which is gathered by the PLCs, transported to the central location of the HMI server. Until recently, much of the process control data was transported over proprietary networks. These are networks provided by field controller manufacturers which supply the PLCs, the network devices, the cabling, the process servers, and the communication format.

Because each proprietary network uses its own communication formats and protocols, manufacturing and industrial facilities are restricted to purchasing all compatible equipment solely from the proprietary network manufacturer. This closed network restriction typically requires the customer to have all software customized to the particular network protocols used by the network manufacturers. Customers also typically maintain programming personnel to develop new device drivers in the proprietary formats in order to maintain compatibility with new equipment or new processes. Without such programming personnel, a customer would have to pay the network manufacturer to develop customer-specific device drivers. Such closed formats cause industrial and manufacturing customers to expend a great deal of money to maintain the network.

Recently, the process controls industry has begun evolving into the use of open architecture networks. One such open architecture network that is beginning to find applications in the process controls industry is Ethernet. Through its business applications, Ethernet has become one of the most popular types of local area networks (LAN) for business or office computer systems. Ethernet is based on carrier sense multiple access/collision detection technology (CSMA/CD). Ethernet devices such as hubs or switches control the data transfer over the network by sensing whether the network is currently in use. If no use is detected, data is allowed to flow through the system. If the system is occupied, the data transfer is held until the system is free. Network devices also detect collisions, which are events caused when two devices attempt to transfer data over the network at the same time. Through this series of collision detection and use sensing, along with priority algorithms for managing collisions, data is quickly and efficiently transmitted between network devices.

One of the main benefits of Ethernet networks for business systems came with the development of 10 Base-T Ethernet technology. The 10 Base-T technology allowed the Ethernet network and information to be transmitted over the regular twisted pair wiring found in most telephone systems. This enables Ethernet networks and LANs to be installed in buildings using the twisted pair wiring already installed for the telephone network. While Ethernet networks may also be constructed with coaxial cable or fiber-optic cable, the twisted pair capability has allowed Ethernet to rise to the level of an industry-standard in office LAN technology.

The data transmission in an Ethernet network derives from the series of network devices such as hubs, switches, and routers. Ethernet hubs are centralized switching units that connect to all of the nodes on the network. Every node connected to the hub transmits its status information to the hub in a standard format, such as simple network management protocol (SNMP). After receiving this information, the hub rebroadcasts it, in SNMP, out to all of the other nodes connected to the hub. In this manner, each device is able to monitor the status and activity of each other device connected to the hub.

While Ethernet grew into an effective business/office LAN standard, the same Ethernet devices could not readily be transported into an industrial controls network. The typically hostile environment on the manufacturing plant floor provides elements, such as extreme temperatures, electrical interference, and continuous vibration, which are generally and desirably not present in an office environment. Ethernet network devices, which were robust enough for the office LAN, would typically experience short life cycles and unreliable performance when exposed to the harsh industrial environment. However, as the industry began recognizing the benefits of the Ethernet standard, companies slowly developed new robust Ethernet devices designed with increased environmental shielding. Thus, the process controls industry began assembling plant and industrial networks using Ethernet technology. Ethernet-based HMI systems and field logic controllers have since been developed for the growing number of process control systems implemented over Ethernet networks. The influx of more suitable Ethernet equipment and compatible software has caused an industry shift toward open architecture networking systems and standardization.

The new Ethernet HMIs basically perform the same function of interfacing the data gathered by the field logic controllers with the human technician. However, with the shift toward open networking, new standardized formats have been developed for communicating process control information within HMI platforms. Based on Microsoft Corporation's OLE technology, a standard called OLE for Process Control (OPC) is being incorporated into more HMI platforms. Working inside of the HMI platform, OPC standardizes the communication of process data obtained from field controllers. While the PLC vendor may still have a proprietary transport protocol, once the information is passed through a system interface, the HMI platform can universally process and internally communicate the data through OPC. In this manner, the HMI system is able to process the information independently from the PLC vendor protocol.

In some industrial applications, excessive pressure or temperature could lead to a catastrophic event causing serious loss of life and/or environmental contamination. These industries in particular have a critical need to monitor the real-time network status to ensure that the real-time process control data received by the HMI system is accurate. Because Ethernet technology became a standard for office LAN systems, many network management software systems exist which monitor network status and performance. Industrial users are thus able to purchase such network management software to monitor their network status. However, process control is critical to many industrial users. Network management software is typically run from a separate server or computer system and generally is monitored from a separate work station.

Because the network management software solutions currently available for industrial users is the same software used by regular businesses and corporations, the tolerance level for program stability and average time between failures is not as stringent. The office or corporate environment does not typically require a high tolerance for program stability. Most industrial users are not willing to risk process control failure by running such a separate network management software with their HMI systems on the same platform. Therefore, industrial Ethernet networks typically have one computer system running the process control HMI platform and a second computer system running the network management software.

An obvious disadvantage to the current state of the art is the dual computer systems generally required. The two systems increase the expense and complexity of the industrial network. One workstation is typically required to monitor process control information while another separate workstation, under control of an entirely separate server, is generally required to monitor the condition of the network.

Furthermore, because the Ethernet standard was developed outside of the process control industry, the communication protocol for network information, SNMP, is incompatible with process control data protocol, OPC. Therefore, the existing Ethernet HMI platforms cannot process or receive the network condition information sent by the network devices.

The only existing way to monitor both network status and process control is through use of some of the proprietary networks. The proprietary networks would typically use a single protocol to communicate all information. However, a major disadvantage of the proprietary networks is the closed network architecture. A proprietary network owner must purchase all equipment and software from the manufacturer. Non-proprietary equipment or software will be incompatible, thus, severely limiting the scalability and flexibility of the network.

SUMMARY OF THE INVENTION

In consideration of the disadvantages inherent in the current state of the art, it would be advantageous to have an HMI platform capable of simultaneously monitoring both network status information and process control data in the same HMI platform and using an open architecture network. These and other features and technical advantages are achieved by a system and method that incorporates a process control data interface and a network data interface into a singular HMI platform, wherein the network data interface converts the network protocol of the open architecture network into the process control protocol for use by the HMI system.

A preferred embodiment of the present invention establishes a system for integrating management of process and network data. It includes a user interface for displaying the process and network data to a user. The inventive HMI platform incorporates a process data interface, in communication with a process interface, for receiving process data gathered by at least one programmable device on a network and at least one network data interface, for receiving network data from a network device. The network data interface receives the network data communicated to the network data interface using a first protocol, such as SNMP or Remote Monitoring (RMON). The inventive system also includes a process server, which is in communication with the user interface, the process data interface, and the network data interface. The process data interface communicates process data to the process server in a second protocol, such as OPC, which preferably has both synchronous and asynchronous transfer ability. The network data interface preferably communicates the network data to the process server in the second protocol by advantageously converting the network data from the first protocol into the second protocol. The process server selectively manipulates both the process data and the network data responsive to a set of application rules and communicates the resulting process and network data to the user interface for display.

The inventive system preferably performs the management integration through a method for managing process control information in a process application implemented with at least one programmable computing unit connected through an open network system. The preferred embodiment method comprises providing process control information to a process information interface, wherein the process control information is gathered by the programmable computing units. The system also preferably provides network status information from at least one network device to a network information interface using a network management protocol, such as SNMP or RMON. The system preferably communicates the process control information to a process control server using a process control protocol, such as OPC. The network status information is preferably translated from the network management protocol into the process control protocol and communicated to the process control server. The process control server compiles the process control information and the translated network status information according to application criteria and then selectively displays the compiled process control information and translated network status information to a user.

A user may also manage and control the network operations through the network devices by issuing network commands delivered through the network information interface. The collection of network information will preferably be suspended while the control commands are sent through network information interface. Therefore, a user may turn on, turn off, redirect, etc., the network devices through the same HMI system from which he/she monitors and controls the process control. Similarly, a user may manage the process control by issuing process commands to the PLCs connected to the network.

The translation is preferably implemented by creating a runtime database that stores all of the retrieved network information after it has been stripped of all control codes generally required by the network management protocol. The network information is then preferably retrieved by a process server interface, which appends the transport codes appropriate to the process control protocol. The translated network information is then communicated to the process server for ultimate presentation to the user.

Depending on the industry or particular needs of the network, the process control and network status data will typically be monitored and/or controlled in real-time. The inventive system allows for configuration to monitor real-time or any other time constraint desired by the user. A preferred embodiment of the present invention also preferably allows configuring the system with additional memory for storing both the process control data and the network condition information. A preferred embodiment would preferably include a chronological memory dedicated to storing the chronological progression of process and network data. Therefore, by accessing this memory a user could track both process control and network status data to observe plant conditions in previous days or hours. A preferred embodiment also preferably includes a parameterized memory dedicated to storing selected process control and network status information. A user could preferably set alarm conditions or limits, such as if a temperature gets too high, or pressure gets too low, or any number of difference conditions. If the real-time data shows any value exceeding these limits, the HMI process server preferably records and stores the process control data along with the corresponding network status information into the parameterized memory. The HMI platform would also typically include other alarms or indicators to draw attention to the alarm condition depending on the volatility of the process state. In addition to setting limits on process data, the user could also specify network data limits such as number of collisions per hour, etc. The network status data would similarly be stored in the parameterized memory along with the corresponding process control data. Therefore, by including all of the data in this memory, the user could determine whether a process control event caused a particular network alarm or vice versa.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

The present invention offers an HMI platform which incorporates the capability to integrate network and process control management into a singular HMI platform over an open architecture. This innovation allows both network management and process control to be run from a single server or computer system, while enhancing the benefits of an open architecture network. In order to appreciate the novelty of the present invention, it is helpful to review the current state of the art with regard to process control management and network control management.

In the present state of the art, there are no HMI systems which allow fully-integrated process control and network management over open architecture networks. Separate systems are available to perform either task. Because the two management systems are completely separate and distinct software platforms, there is a risk that processing resources would be overloaded, thus providing a point of failure for the entire system, if both platforms were run from the same computer system. Also, the currently available network management systems were not designed specifically for industrial or process control applications. Therefore, these network management systems are not typically implemented with the high level of stability criteria generally desirable in industrial settings. For these reasons, industrial users typically run both systems on separate computer platforms in order to manage process control and the connecting network.

Figure 1:
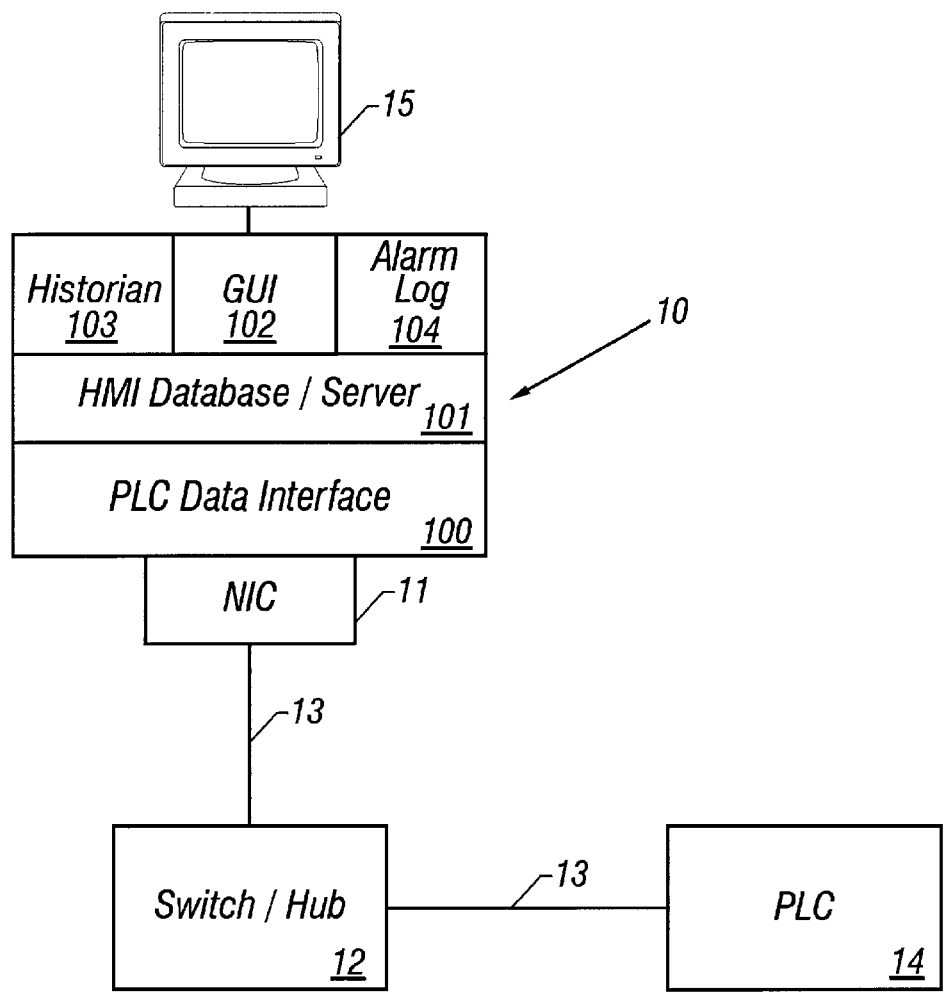
FIG. 1 is a block diagram illustrating a prior art HMI platform in a process control configuration.

FIG. 1 illustrates the prior art process control system implemented with HMI software. HMI platform 10 is a software package made up of several distinct functions run on a computer system connected to Ethernet network 13. Network Interface Card (NIC) 11 provides HMI platform 10 with data transmitted over network 13. In an industrial environment, Programmable Logic Controllers (PLCs) are situated throughout the process for gathering process control data. PLCs may be local to a plant floor or may be situated at remote locations. The PLCs typically transmit their collected data to the monitoring system through network 13 in real-time. FIG. 1 shows PLC 14 connected to network 13 through which it communicates the process control information to HMI platform 10. As a part of network 13, Ethernet switch/hub 12 generally facilitates the continuous transmission of real-time data from PLC 14 to HMI platform 10 through NIC 11. Switch/hub 12 may be any Ethernet controllable device such as a switch, hub, router, etc.

In operation, PLC 14 performs its process control function. For purposes of this example, PLC 14 measures a process temperature as one of its programmed assignments. PLC 14 measures a process temperature of 1100° F. The temperature data is transmitted over network 13 to switch/hub 12 in a vendor-specific transmission protocol. Switch/hub 12 directs the transmission of the temperature data to NIC 11. NIC 11 is connected to PLC data interface 100 of HMI platform 10. The temperature data is communicated to PLC data interface 100, which uses a vendor-specific device driver to convert the vendor-specific transmission protocol into a process control format, such as the defacto standard OPC protocol. The temperature data is then forwarded in OPC to HMI database/server 101 to be processed. HMI database/server 101 performs all of the functions, calculations, and processing for the services offered in the particular HMI software package. HMI database/server 101 assembles the temperature data into a form for display and sends the display information to Graphical User Interface (GUI) 102 for presentation on process control workstation 15. HMI database/server 101 will then store the temperature data to historian 103, which is a memory location for storing the chronological process control data of the system. A user is generally able to access historian 103 to retrieve process control information for a particular passed time or time period. If the user has set alarm conditions, HMI database/server 101 will compare the temperature data against those conditions. For purposes of this example, the user may have set a temperature alarm limit at 1000° F. Because the temperature data measured by PLC 14 exceeds the temperature alarm limit, HMI database/server 101 also stores the temperature data in alarm log 104. Alarm log 104 is a specialized memory location for storing process control data which exceed user-specified alarm limits. HMI database/server 101 monitors the continuous flow of process data against the specified alarm limits to establish the triggering alarm conditions.

Figure 2:
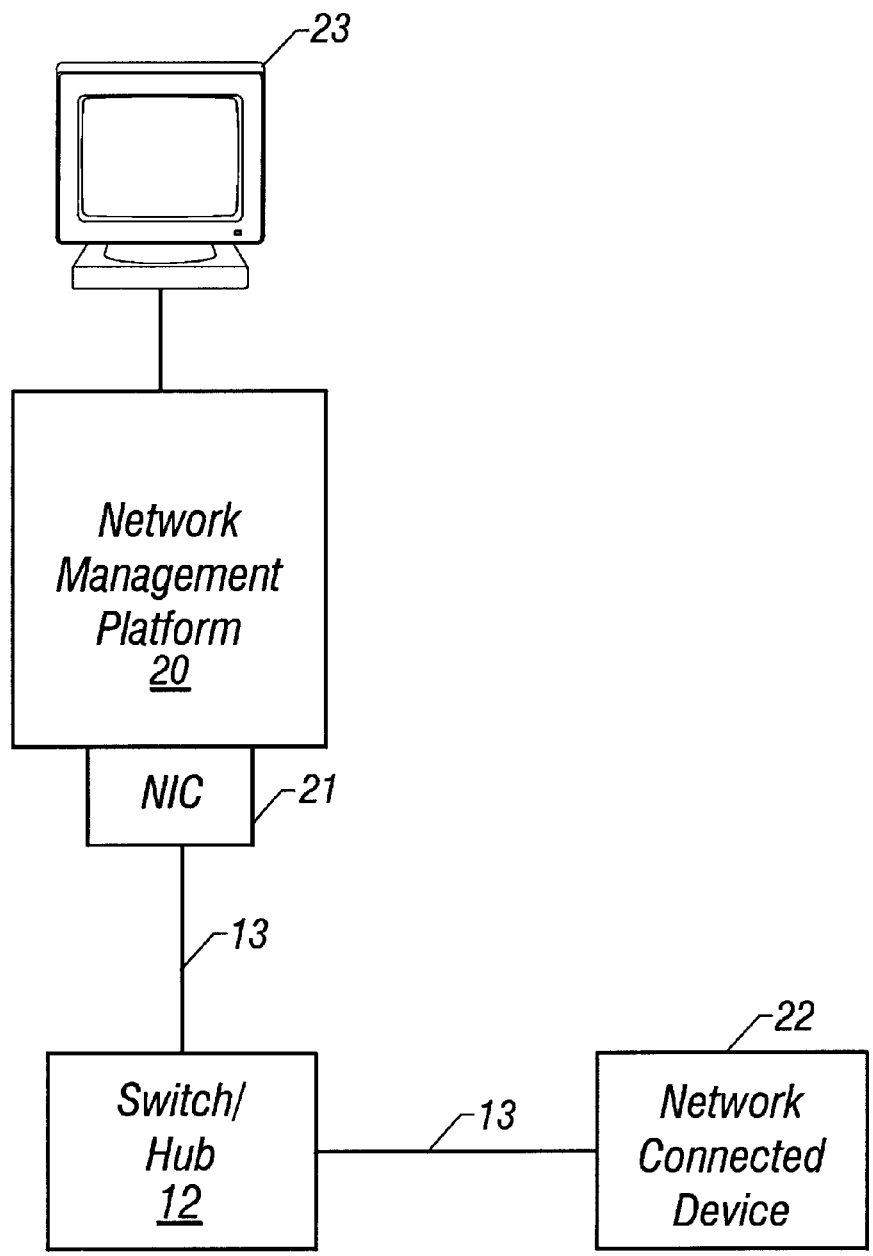
FIG. 2 is a block diagram illustrating a prior art Network Management Software solution for monitoring and managing an Ethernet network.

FIG. 2 shows the prior art configuration of an Ethernet network management solution. Network management platform 20 is also a software package run on a computer system that monitors the status and diagnostic data received from the network devices. Network management platform 20 connects to Ethernet network 13 through NIC 21. Network management platform 20 receives and monitors the network status information transmitted by switch/hub 12. While network connected device 22 may typically represent a device such as PLC 14 shown in FIG. 1, because network management platform 20 only monitors the status or condition of the network elements, its function is focused on the condition of the network devices such as switch/hub 12. Therefore, it usually does not recognize the functionality of network connected device 22.

Using the standard Ethernet transmission protocol, SNMP, switch/hub 12 and network management platform 20 communicate control, diagnostic, and network status information over network 13 and through NIC 21. The diagnostic data for switch/hub 12 transmitted to NIC 21 is interfaced with network management platform 20. Network management platform processes the diagnostic data for any and all functions offered by the network management software package. Network management platform 20 assembles the diagnostic and status information and presents it to a user on network management workstation 23.

Figure 3:
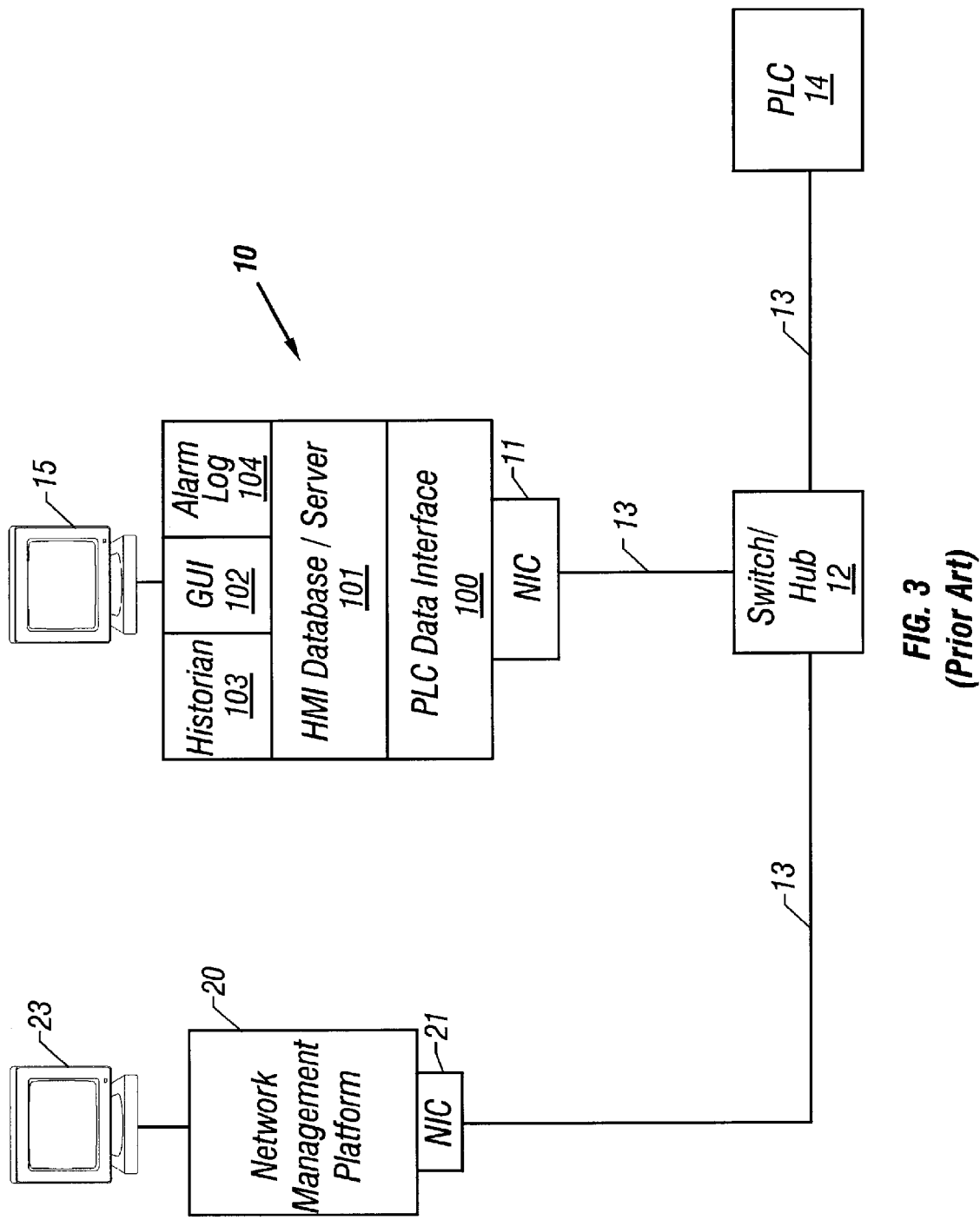
FIG. 3 is a block diagram illustrating a prior art configuration for obtaining both process control through an HMI platform and network monitoring through a Network Management Software platform.

For implementing network management in addition to process control in industrial Ethernet networks, users typically must purchase separate network management software to run on a separate computer system connected into the industrial network. FIG. 3 illustrates the method currently available to implement both network management and process control over an industrial Ethernet network. In application, the process for the dual system is simply the joining of the systems described and shown in FIGS. 1 and 2.

Process control data gathered by PLC 14 is transmitted over network 13 to HMI platform 10 through NIC 11, while network status information is transmitted from switch/hub 12 to network management platform 20 through NIC 21. Both HMI platform 10 and network management platform 20 are implemented on separate computer systems each connected into Ethernet network 13. The information received through PLC Database 100 is compiled by HMI database/server 101 and displayed on process control workstation 15 through GUI 102. The network status information is processed by network management platform 20 and displayed on network management workstation 23. Therefore, a user must typically monitor both process control workstation 15 and network management workstation 23 to manage the entire industrial or manufacturing system. The user would also need to maintain both computer systems to ensure proper operation.

Furthermore, the current methods do not provide any interaction between the network diagnostic information and the process control information. Separate checks must be performed to ensure the network and process are operating properly. If alarm conditions arise in the process control environment, there is no method other than manual searching to coordinate the network condition for the alarm condition time periods.

Industrial users do have one currently available option for securing a network with integrated network and process control management. Some proprietary networks offer this integrated feature. However, by using proprietary networks, users are limited to a closed system architecture. In such proprietary systems, the vendor develops a specific transport protocol for use in transmitting both network status data and process data. The proprietary HMI platform is then capable of presenting the integrated information to a user over a single display. While the integration feature is offered in the proprietary systems, none of these systems utilize the fast and reliable Ethernet network standards or flexibility to purchase any Ethernet-compatible network device or PLC. Therefore, by choosing the proprietary scheme, an industrial user not only obtains a closed network which is compatible only with elements, devices, and software developed by the network vendor, but also does not obtain the benefits of an Ethernet network.

Figure 4:
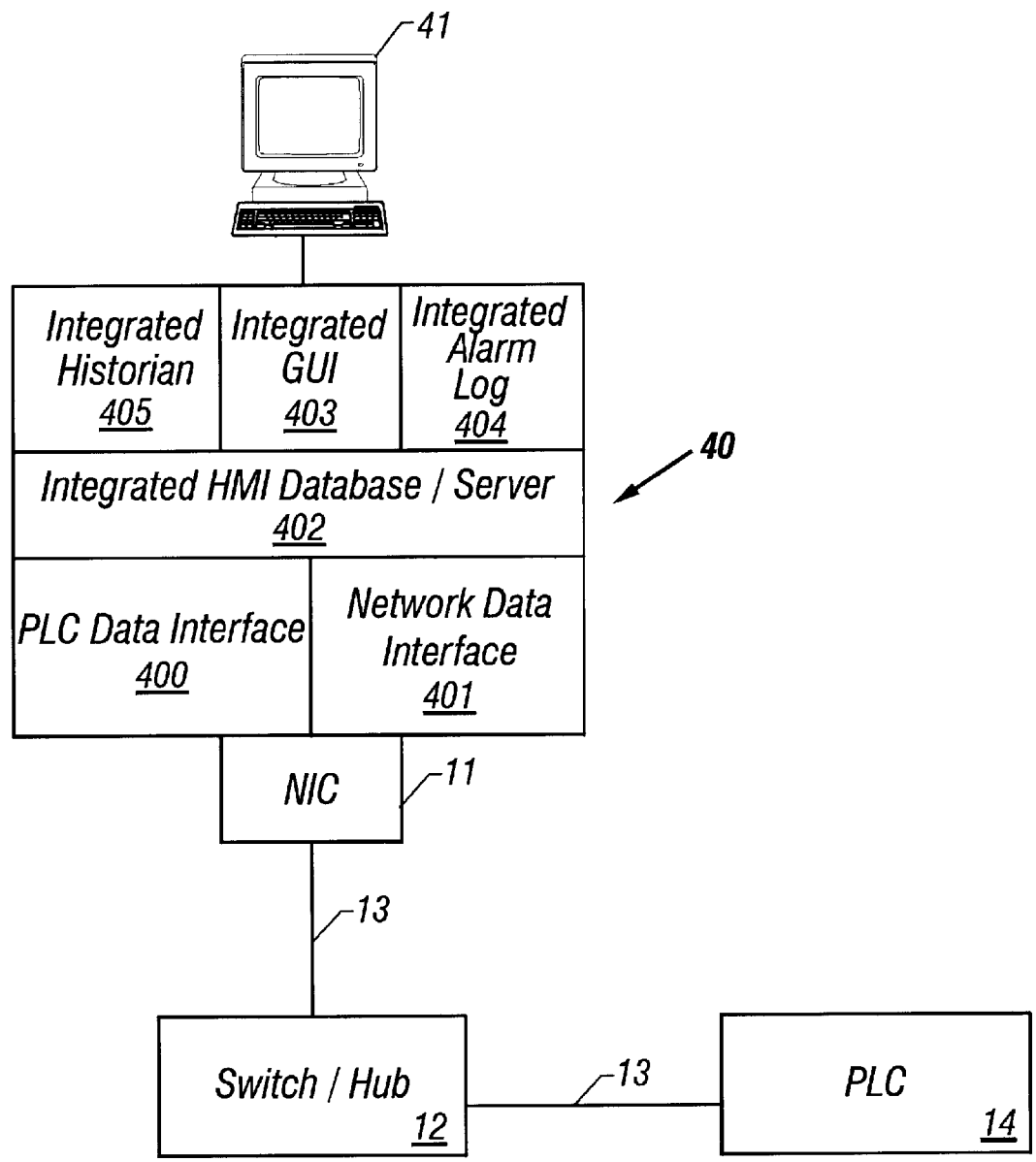
FIG. 4 is a block diagram illustrating a preferred embodiment of the present invention for providing integrated process control and network management in a singular HMI platform over an open architecture network.

A preferred embodiment of the present invention is shown in FIG. 4. Using the example Ethernet network set-up from FIG. 1, PLC 14 measures a temperature of 1100° F. for a particular process. PLC 14 preferably sends the temperature process control data to integrated HMI platform 40 over Ethernet network 13. The temperature data is advantageously directed through switch/hub 12 to NIC 11. PLC data interface 400 receives the temperature data and typically uses a PLC vendor-specific device driver to translate the vendor's device transmission protocol into a standard process control format, such as OPC. PLC data interface 400 then passes the temperature data to integrated HMI database/server 402. Integrated HMI database/server 402 processes the temperature data and sends it for display on integrated management workstation 41 by integrated GUI 403.

It should be noted that PLC 14 may include support features to supply network status information in the same manner as a network device such as switch/hub 12. The preferred embodiment of the present invention would preferably also obtain network status information from such network-intelligent PLCs using the network management protocol.

Unlike the prior art methods, a preferred embodiment of the present invention allows network diagnostic data to also be managed by integrated HMI database/server 402. Thus, the network status becomes part of the "process" manageable by integrated HMI platform 40. Ethernet switch/hub 12 uses the Ethernet standard SNMP to communicate network status or diagnostic information with integrated HMI platform 40. The status information is preferably transmitted to NIC 11. Network data interface 401 preferably retrieves the network diagnostic data in SNMP format from NIC 11 and advantageously converts it for use with process control OPC format. Once the conversion is complete, network data interface 401 passes the network status information data to integrated HMI database/server 402. Here, integrated HMI database/server 402 preferably includes functionality which recognizes the network data and processes it according to the features offered in the integrated HMI software package. Integrated HMI database/server 402 preferably forwards the network data through integrated GUI 403 for display on integrated management workstation 41 simultaneously with the process control data corresponding to the same time frame.

In a preferred embodiment of the present invention, integrated HMI database/server 402 stores the corresponding process control data and network status information into integrated historian 405. A user may then recall both the network status and process control status for the system at a given past time. Integrated HMI database/server 402 also may perform comparisons against user-defined alarm conditions to determine if such conditions have been exceeded. For example, in addition to the temperature data from PLC 14 of 1100° F., switch/hub 12 hypothetically sends information that the present collision rate is 5 collisions per hour. The user hypothetically defines a temperature limit of 1000° F. and a collision limit of 10 collisions per hour. In the preferred embodiment shown in FIG. 4, integrated HMI database/server 402 compares the process control and network status data to the selected limits. Because the temperature reading exceeds the limit, integrated HMI database/server preferably stores the temperature data into integrated alarm log 404 along with its corresponding network status data. It is typically desirable to examine all system information when analyzing alarm conditions. Therefore, even though the network status data was within the limits set by the user, it is preferably stored with the excessive temperature reading to allow complete system analysis. Integrated HMI database/server 402 would also preferably store network and process control data into alarm log 404 if the network data exceeded the predefined limit while the process control data did not. Similarly, integrated HMI database/server 404 would preferably store both sets of data if each exceeded its corresponding predefined limit conditions.

It should be noted that the preferred embodiment of the present invention enhances the ability of the HMI platform to monitor and control network information as well as the process control information. Unlike the prior art, which, even if run from the same computer system in contradiction to the accepted industry practice, might allow multitasked monitoring of both network and process control information, the preferred embodiment of the present invention truly integrates the processes thereby making the network data available to the HMI platform in a format which it is capable of processing and controlling just as it processes and controls the process control data. In the prior art systems, the network management and process control management always remain two separate processes run from two separate software platforms. Because of the incompatible protocols of the information gathered, there could be no integration of management capability.

The preferred embodiment of the present invention provides the unified system monitoring from a single process, i.e., the HMI platform. The inventive process of the present invention transforms network status data into a form that can be accessed, processed, manipulated, and/or displayed by the HMI system. Therefore, the preferred embodiment of the present invention allows universal management of both subsystems (i.e., the network and the process) from the same singular software platform having a singular management process.

Figure 5:
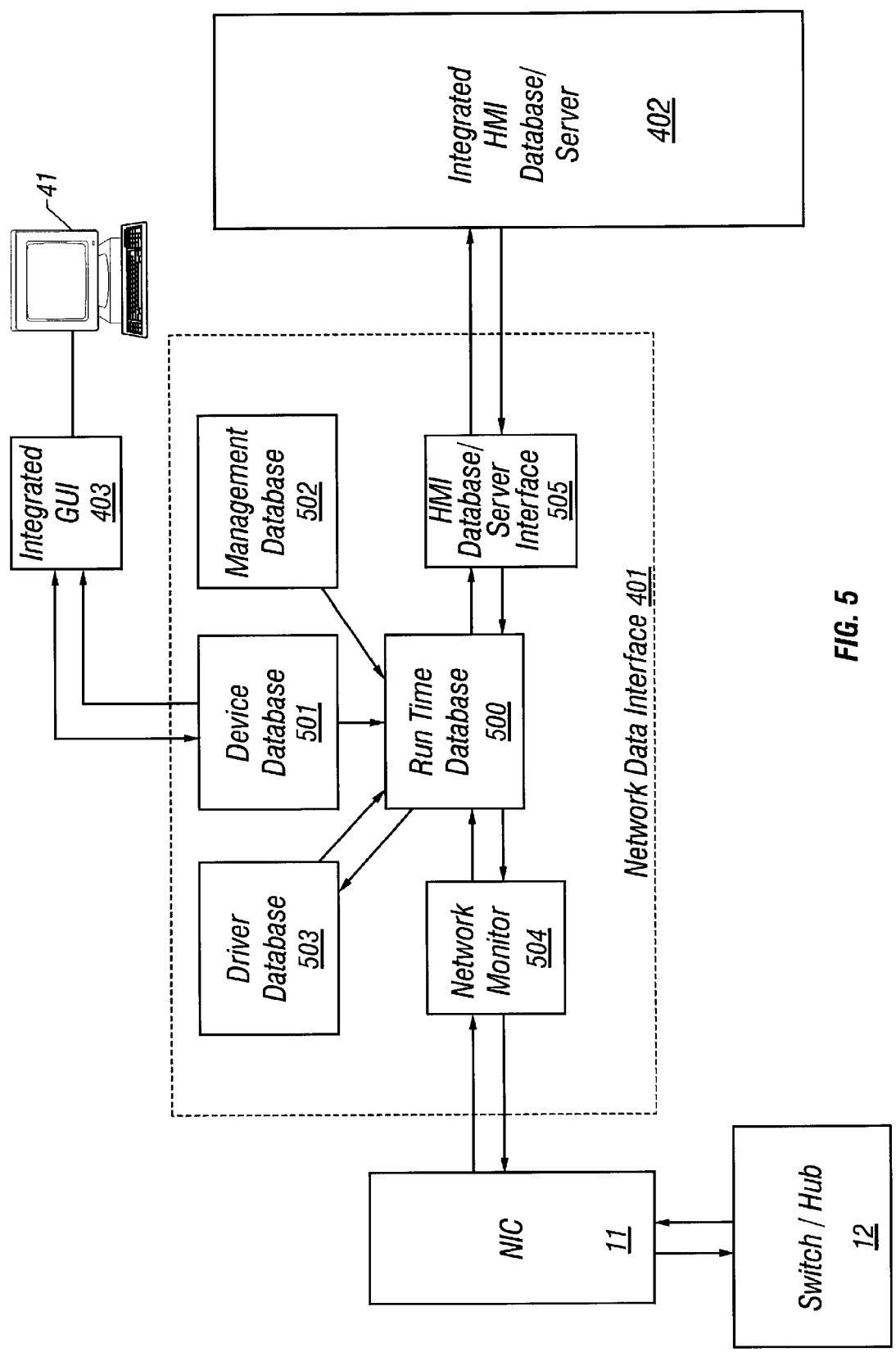
FIG. 5 is a block diagram illustrating the details of the network data interface.

FIG. 5 illustrates a detailed view of the conversion process as implemented through network data interface 401. Central to the operation of the conversion process, runtime database 500 preferably stores all retrieved network diagnostic information in a format without any of the transport or control codes such as those typically used by either SNMP or OPC. This advantageously allows simultaneous access to the network diagnostic information by processes which operate either in network management or process control management.

As a process network is established or initialized, or a new device is added, the user preferably enters device information, such as IP address, local name, management information base (MIB), etc., through integrated management workstation 41. This information may alternatively be provided automatically by device installation software, or may be provided through an automated communication connection to a local or wide area network, such as the Internet. This information is preferably carried through integrated GUI 403 and stored in device database 501. The device information in device database 501 is coordinated with a comprehensive database of standard device characteristics stored in management database 502. Management database 502 is preferably pre-loaded with standard device information available from device manufacturers. It would preferably include any supplemental address information and lists of all types of information, data, or reports available from the device. For example, if a user adds a network hub from company X, the user would enter into device database 501 that a company X network hub of a certain model number has been added to the network in region Y. This information would be related to the information stored on management database 502 which would provide the appropriated instructions, addresses, and other information for the device and for the data available that may be provided by such a company X network hub.

At initialization of the system, or when the system is updated after adding new devices, runtime database 500 preferably extracts all relevant device information from each of device database 501 and management database 502. The device addresses and lists of possible data that each connected device may provide is stored in one region of runtime database 500. The device information is generally used to obtain network diagnostic information or to send control codes to network devices such as switch/hub 12. In operation, runtime database 500 preferably provides network monitor 504 the device information used to obtain the requested network information. Network monitor 504 would then preferably send polling messages to each network device for which it has the device information.

Network monitor 504 preferably comprises a communications interface between runtime database 500 and the network devices. In the preferred embodiment described herein, network monitor 504 is configured to automatically and periodically poll each connected network device. As network monitor 504 begins a polling iteration, it preferably obtains the necessary device information from runtime database 500, which preferably obtains this information from device database 501. Network monitor 504, thus, sends polling signals to switch/hub 12 through NIC 11 using the device information originally stored on device database 501 and management database 502. On receiving the polling signals, switch/hub 12 preferably sends its diagnostic information to network monitor 504 back through NIC 11. This network information is generally transported back and forth between network monitor 504 and switch/hub 12 using a network management protocol, such as SNMP. When network monitor 504 receives the network information, it preferably stores all of the network information records into runtime database 500 after stripping all SNMP protocol codes, signals, or headers. Runtime database 500 maintains this current network information in a storage region for active network data. However, periodically, the recorded network information may be archived at a different location or placed onto removable storage media.

In an alternative embodiment, driver database 503 preferably monitors all of the network information traffic and stores records which include the number of messages sent out to and received from network devices, the number of communication errors per device, and any other performance data that might be useful for monitoring network status. This information may be used to monitor the performance of the integrated HMI platform as well as the network conditions.

HMI database/server interface 505 preferably extracts selected network diagnostic information from runtime database 500 for communicating the information to a process server, such as integrated HMI database/server 402. After the raw information has been extracted, HMI database/server interface 505 preferably adds transport and control codes indicative of OPC prior to sending the network diagnostic data to integrated HMI database/server 402. Thus, the original network diagnostic data is translated from the network management protocol, SNMP, to the process control protocol, OPC.

If a user desires to control or write data to any of the connected network devices, the user preferably sends the desired control commands or data message using integrated management workstation 41. According to a preferred embodiment, the control signals will be communicated to network monitor 504 through integrated GUI 403, device database 501, and runtime database 500. Network monitor 504 then suspends any device polling while it transmits the signals to the appropriate network device. Commands may be issued to turn a device on or off, or possibly to redirect information to another network node or device. A user may also write data to individual network devices which contains various information which the device may use in initialization or in communicating with the network. Once the signals have been successfully sent, network monitor 504 resumes the polling process. In a similar fashion, a user may control the processes executed by the PLCs by issuing control commands transported through PLC data interface 400, shown in FIG. 4.

In an alternative embodiment of the present invention, network monitor 504 may preferably be configured to poll connected network devices only when such information is requested by integrated HMI database/server 402 through HMI database/server interface 505. It should also be noted that the communication of network diagnostic information among network monitor 504, runtime database 500, and HMI database/server interface 505 may preferably operate in a multi-threaded manner. Thus, HMI database/server interface 505 may communicate to integrated HMI database/server 402, network diagnostic information extracted from runtime database 500 at the same time that network monitor 504 communicates received network diagnostic information to runtime database 500.

In an alternative embodiment of the present invention, network data interface 401 may also preferably include a central control module (not shown) for controlling all communications between runtime database 500, network monitor 504, and HMI database/server interface 505. In such an alternative embodiment, a single set of communication code instructions would be incorporated into the central controller to initiate and complete communication activities simultaneously. The control module preferably would provide a single point to manage all information communication within network data interface 401.

It should also be noted that the values given above for the temperature and collision rate are merely for the purpose of example. A preferred embodiment of the present invention preferably does not limit the data or functions available to the PLCs or the Ethernet controllable network devices. PLCs may be incorporated by a user to perform any desired task. Likewise, any type of network device may be used to implement the network architecture designed for the particular process or industry.

It should also be noted that alternative embodiments of HMI platforms configured according to the present invention may not necessarily incorporate memory structures such as integrated historian 405 and/or integrated alarm log 404, as shown in FIG. 4. Alternative embodiments may also use plain text interfaces for presenting and displaying the process control and network diagnostic data to a user. In fact, alternative embodiments may incorporate any number of different methods for presenting the incorporated data to the user.

It should also be noted that the preferred embodiments of the present invention described herein are directed to systems using the protocols of OPC for process control applications and SNMP for Ethernet networks because of their status as industry standard protocols. Other process control protocols, which are capable of both synchronous and asynchronous transfer mechanisms, and other network transfer protocols, such as RMON, which are incompatible with the process control protocols, may also be incorporated into the functionality of alternative embodiments of the present invention for purposes of integrating the management of the process control and network status management.

It should also be noted that while the preferred embodiments of the present invention have heretofore been described as implemented over Ethernet networks, the present invention is in no way limited to only the Ethernet topology. The present invention may beneficially be implemented on any number of different network formats or topologies such as token ring, arcnet, or the like which utilizes any combination of isochronous, synchronous, and/or asynchronous transport mechanisms over any combination of wireline/cable, fiber optics, and/or wireless transmission paths.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for simultaneously managing process control and network operation in a process application environment having at least one processing unit connected through a communication network assembled with at least one network device, said system comprising: a process interface for receiving said process control information from said at least one processing unit;
   a network interface for receiving network information from said at least one network device wherein said network information is communicated using a first protocol;
   an application server for selectively manipulating said process control information and said network information for display to a user, wherein said process interface communicates said process control information to said application server using a second protocol, and wherein said network interface converts said network information for communication to said application server in said second protocol.

2. The system of claim 1 wherein said network interface receives network information from said at least one processing unit.

3. The system of claim 1 further comprising:
   a chronological memory in communication with said application server for storing said process control information and network information in relation to a time defining when said process control and said network information were gathered; and
   a characteristic memory in communication with said application server for selectively storing process information and network information according to user-selected storage characteristics.

4. The system of claim 3 wherein said communication network comprises an Ethernet network and wherein said network device comprises an Ethernet device.

5. The system of claim 1 wherein said application server displays said manipulated process control and network information using a graphical user interface (GUI).

6. The system of claim 3 wherein said user-selected storage characteristics comprise process control information extreme values, wherein said process control information is selectively stored to said characteristic memory when said process control information exceeds said extreme values.

7. The system of claim 1 wherein said process control information and said network information are gathered in real time.

8. The system of claim 1 wherein said network interface comprises:
a universal database for storing said network information without control codes of said first protocol;
a network monitor for obtaining said network information from said at least one network device in said first protocol, wherein said network monitor removes all of said control codes and stores said network information in said universal database; and
an application server interface in communication with said universal database for providing said network information to said application server in said second protocol, wherein said application server interface retrieves said network information from said universal database and adds all necessary control codes of said second protocol.

9. The system of claim 8 wherein said network interface further comprises:
a first memory location for storing installation information for each of said at least one network device and each of said at least one processing unit, wherein said installation information is stored as network devices and processing units are added to said system; and
a second memory location for storage of management and address information available for each of said at least one network device wherein said management and address information correspond to ones of said installation information;
wherein said universal database uses said installation information from said first memory location to obtain said corresponding management and address information, used in obtaining said network information, from said second memory location.

10. The system of claim 8 wherein said second memory location also stores management and address information available for each of said at least one processing unit.

11. The system of claim 8 further comprising a third memory location for storing copies of said network information obtained by said network monitor.

12. The system of claim 8 wherein said network monitor automatically polls said at least one network device to receive said network information for storage in said universal database.

13. The system of claim 8 wherein said network monitor polls said at least one network device to receive said network information in response to a request communicated by said application server to said application server interface.

14. The system of claim 8 wherein said network monitor obtains said network information at the same time that said application server interface provides other of said network information to said application server.

15. The system of claim 8 wherein said network monitor interrupts said obtaining of said network information to control said at least one network device by sending control data to said at least one network device.

16. The system of claim 15 wherein said network monitor resumes said obtaining of said network information after sending said control data.

17. The system of claim 8 wherein said runtime database maintains an internal look up table containing the available categories of network information obtainable by said network monitor.

18. The system of claim 17 wherein said application server interface checks said internal look up table to determine the availability of network information which is responsive to a request for network information made by said application server prior to said network monitor polling for said requested network information.

19. A system for integrating management of process control and network operation comprising:
a user interface for displaying process and network data to a user;
a process data interface for receiving process data gathered by a programmable device on a network;
a network data interface for receiving network data from at least one network device, wherein said network data is communicated to said network data interface using a first protocol; and
a process server in communication with each of said user interface, said process data interface, and said network data interface, wherein said process data interface communicates process data to said process server in a second protocol having both synchronous and asynchronous transfer ability, wherein said network data interface communicates said network data to said process server in said second protocol by converting said network data from said first protocol into said second protocol; and
wherein said process server selectively manipulates said process data and said network data and communicates said manipulated process and network data to said user interface.

20. The system of claim 19 wherein said network data interface receives network data from said at least one programmable device using said first protocol.

21. The system of claim 19 further comprising:
a general memory in communication with said process server for retrievably storing said process and network data; and
a special memory in communication with said process server for selectively storing process and network data according to preselected storage criteria, wherein said selectively stored process and network data is retrievable by said process server.

22. The system of claim 21 wherein said network comprises an Ethernet network and wherein said network device comprises an Ethernet device.

23. The system of claim 21 wherein said interface comprises a graphical user interface (GUI).

24. The system of claim 22 wherein said first protocol comprises simple network management protocol (SNMP).

25. The system of claim 22 wherein the first protocol comprises remote monitoring (RMON).

26. The system of claim 21 wherein said second protocol comprises OLE for process control (OPC).

27. The system of claim 21 wherein said preselected storage criteria comprise user selectable process data extreme values, wherein said process data is selectively stored to said special memory along with said network data corresponding to said process data when said process data exceeds said extreme values.

28. The system of claim 21 wherein said preselected storage criteria comprise user selectable network data extreme values, wherein said network data is selectively stored to said special memory along with said process data corresponding to said network data when said network data exceeds said extreme values.

29. The system of claim 19 wherein said process and network data are gathered in real time.

30. The system of claim 19 wherein said network data interface comprises:
- a runtime database for storing said network data in a storage format compatible with said first protocol and said second protocol;
- a first protocol interface module for facilitating communication of said network data between said at least one network device and said network data interface and for converting said network data between said first protocol and said storage format; and
- a second protocol interface module for converting said network data between said storage format and said second protocol and for facilitating communication of said converted network data between said network data interface and said process server.

31. The system of claim 30 further comprising a control module in communication with said runtime database, said first protocol interface module, and said second protocol interface module, wherein said control module manages communication activities between said runtime database and said first and second protocol interface modules.

32. The system of claim 30 wherein said network data interface further comprises:
- a device database in communication with said runtime database for storing device information regarding each of said at least one network device and each of said at least one processing unit; and
- a management database in communication with said runtime database for storing management and location information corresponding to said device information regarding each of said at least one network device and each of said at least one processing unit;
- wherein said runtime database obtains from said device database and said management database, device, management, and location information used to initiate and complete communication activities between said network data interface and selected ones of said at least one network device and said at least one processing unit.

33. The system of claim 30 further comprising a status database in communication with said runtime database for storing records of all of said network data received by said first protocol interface module.

34. The system of claim 31 wherein said control module comprises:
- a network communication routine for managing said communication activities of said first protocol interface module; and
- a process control communication routine for managing said communication activities of said second protocol interface module.

35. The system of claim 31 wherein said control module automatically requests said at least one network device to communicate said network data for storage in said runtime database.

36. The system of claim 31 wherein said control module requests said at least one network device to communicate said network data responsive to a request communicated by said application server using said second protocol interface module.

37. The system of claim 34 wherein said network communication routine obtains said network data at the same time that said process control communication routine provides other of said network data to said application server.

38. The system of claim 34 wherein said network communication routine interrupts said obtaining of said network data to control said at least one network device by sending device instructions to said at least one network device.

39. The system of claim 38 wherein said network communication routine resumes said obtaining of said network data after sending said device instructions.

40. A method for managing process control and network diagnostic information in a process application implemented with at least one programmable computing unit connected through a network, said method comprising the steps of:
- providing said process control information to a process interface, wherein said process control information is gathered by said at least one programmable computing unit;
- providing said network diagnostic information from each of at least one network device to a network interface using a network management protocol;
- communicating said process control information to a process control server using a process control protocol;
- translating said network diagnostic information from said network management protocol into said process control protocol;
- communicating said translated network diagnostic information to said process control server using said process control protocol; and
- selectively displaying said process control information and said translated network diagnostic information to a user.

41. The method of claim 40 further comprising the steps of:
- storing said process control information and said network diagnostic information in a chronological memory; and
- selectively storing said process control information and said network diagnostic information in an alarm log memory responsive to a set of process control parameters.

42. The method of claim 40 wherein said selectively displaying step comprises the steps of:
- rendering said process control information and said translated network diagnostic information into graphical display instructions; and
- graphically displaying said process control information and said translated network diagnostic information to said user.

43. The method of claim 40 wherein said network management protocol comprises simple network management protocol (SNMP).

44. The method of claim 40 wherein said process control protocol comprises OLE for process control (OPC).

45. The method of claim 41 wherein said set of process control parameters comprises a set of process control and network diagnostic information limits, wherein said process control information and said translated network diagnostic information are correspondingly stored in said alarm log memory when at least one of said limits are exceeded.

46. The method of claim 40 wherein the steps of providing said process control information and providing said network diagnostic information steps are performed in real time.

47. The method of claim 40 wherein said translating step and said communicating said translated network diagnostic information step comprise the steps of:

stripping code information representative of said network management protocol from said network diagnostic information;

storing said stripped network diagnostic information in a memory location;

removing said stripped network diagnostic information from said memory location;

adding code information representative of said process control protocol to said network diagnostic information; and delivering said coded network diagnostic information to said process control server using said process control protocol.

48. The method of claim 40 wherein said providing said process control information step and said providing said network diagnostic information step occur simultaneously.

49. The method of claim 40 wherein said providing said network diagnostic information step occurs in response to a request from said process control server.

50. The method of claim 40 wherein said providing said network diagnostic information step occurs automatically.

51. A system for converting a network management protocol to a process control protocol comprising:

a runtime database for storing network diagnostic data without transport codes indicative of said network management protocol;

a network administration module for obtaining said network diagnostic data from said at least one network device in said network management protocol, wherein said network administration module removes said network management protocol transport codes and stores said network diagnostic data to said runtime database; and a process control module in communication with said runtime database for providing said network diagnostic data to a process application server in said process control protocol, wherein said process control module retrieves said network diagnostic data from said runtime database and adds necessary transport codes indicative of said process control protocol.

52. The system of claim 51 wherein said network administration module obtains network diagnostic data from at least one programmable computing unit in said network management protocol.

53. The system of claim 51 further comprising:

a first memory for storing device information for each of said at least one network device wherein said device information is accumulated as network devices are added to said system; and a second memory for storage of management and address information available for each of said at least one network device wherein said management and address information corresponds to said device information;

wherein said runtime database uses said device information from said first memory to obtain management and address information, used in obtaining said network diagnostic data, from said second memory.

54. The system of claim 53 wherein said first memory stores device information for each of said at least one programmable computing unit, wherein said device information is accumulated as programmable computing units are added to said system.

55. The system of claim 53 further comprising a third memory for storing copies of network diagnostic data received by said network administration module.

56. The system of claim 51 wherein said network administration module automatically polls said at least one network device to receive said network diagnostic data for storage in said runtime database.

57. The system of claim 51 wherein said network administration module polls said at least one network device to receive said network diagnostic data in response to a request communicated by said process application server to said process control module.

58. The system of claim 51 wherein said network administration module obtains said network diagnostic data at the same time that said process control module provides other of said network diagnostic data to said process application server.

59. The system of claim 51 wherein said network administration module interrupts said obtaining of said network diagnostic data to control said at least one network device by sending instruction signals to said at least one network device.

60. The system of claim 59 wherein said network administration module resumes said obtaining of said network diagnostic data after sending said instruction signals.

61. The system of claim 51 wherein said runtime database maintains an internal look up table containing the available categories of network diagnostic data obtainable by said network administration module.

62. The system of claim 61 wherein said process control module accesses said internal look up table to determine the availability of network diagnostic data which is responsive to a request for network diagnostic data made by said process application server prior to said network administration module polling for said requested network diagnostic data.

* * * * *